United States Patent

Bohy et al.

[11] 4,071,341
[45] Jan. 31, 1978

[54] APPARATUS FOR FORMING GLASS FIBERS

[75] Inventors: August G. Bohy, Lower Burrell; Herbert W. Barch, Natrona Heights, both of Pa.

[73] Assignee: PPG Industries, Inc., Pittsburgh, Pa.

[21] Appl. No.: 775,659

[22] Filed: Mar. 8, 1977

[51] Int. Cl.$^2$ .............................................. C03B 37/02
[52] U.S. Cl. .................................. 65/11 W; 65/3 R; 65/4 R; 118/238
[58] Field of Search ............. 65/3 R, 3 A, 3 C, 11 W, 65/3 B, 4 R; 118/238

[56] References Cited

U.S. PATENT DOCUMENTS

| | | | |
|---|---|---|---|
| 2,772,518 | 12/1956 | Whitehurst et al. | 65/11 W X |
| 3,356,565 | 12/1967 | Smucker et al. | 162/199 |
| 3,378,395 | 4/1968 | Faber | 117/120 |
| 3,560,178 | 2/1971 | Minkler | 65/3 |
| 3,585,015 | 6/1971 | Hohlfeld et al. | 65/3 |
| 3,820,967 | 6/1974 | Johnson | 65/2 |
| 3,827,397 | 8/1974 | Hebberling | 118/50 |
| 3,844,497 | 10/1974 | Harrill et al. | 65/11 W |
| 3,848,565 | 11/1974 | Schweppe | 118/234 |
| 3,999,970 | 12/1976 | Barch et al. | 65/3 R |

*Primary Examiner*—Arthur D. Kellogg
*Attorney, Agent, or Firm*—Alan T. McDonald; John E. Curley

[57] ABSTRACT

An apparatus for producing glass fibers is disclosed. The glass filaments are passed across a gathering shoe which may reciprocate in a path such that, when extended, the gathering shoe positions the filaments such that they are out of contact with the application surface of an applicator, which is located between the bushing through which the filaments are attenuated and the gathering shoe so that the filaments are not coated with a binder and/or size from the application surface. The gathering shoe is extended when waste strand is being attenuated, such that the waste strand is not coated with the binder and/or size.

12 Claims, 3 Drawing Figures

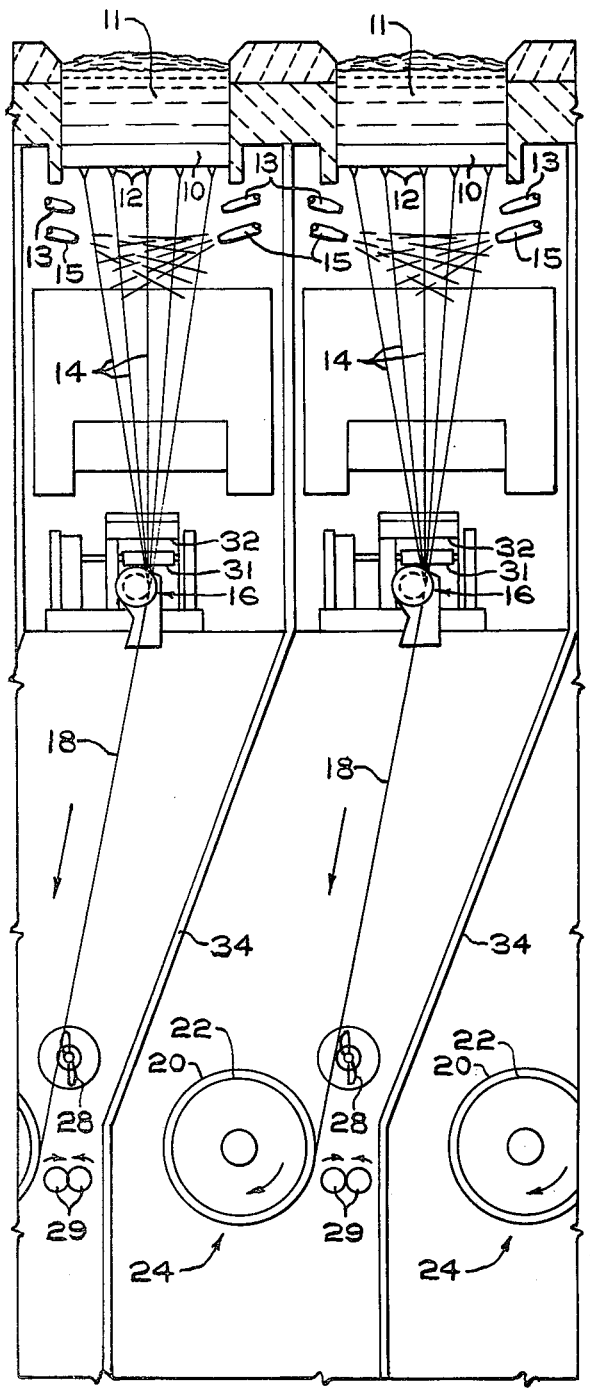
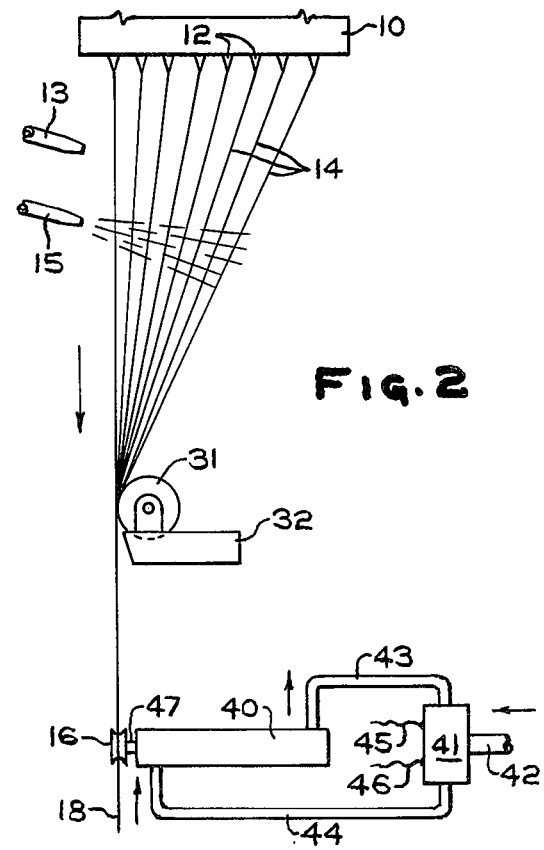
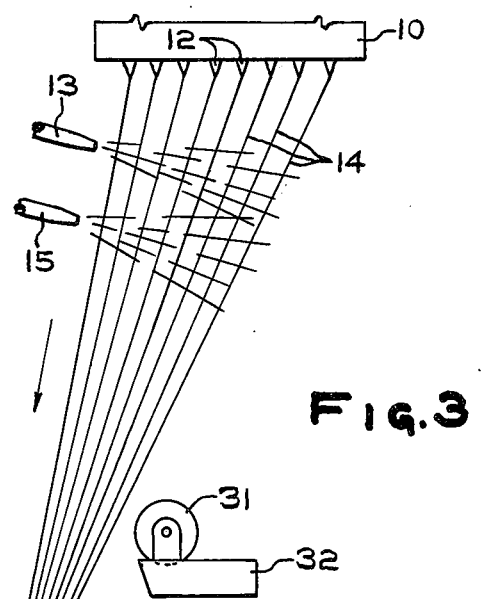
Fig. 1
Fig. 2
Fig. 3

APPARATUS FOR FORMING GLASS FIBERS

BACKGROUND OF THE INVENTION

Glass strand is typically produced by attenuating filaments through orifices or tips at the bottom of a heated bushing containing molten glass. The filaments may be cooled by spraying them with water as they leave the bushing. The filaments are then passed across the application surface of an applicator where they are coated with a binder and/or size. The coated filaments are then gathered into strand form in a gathering shoe, which is typically a grooved wheel or cylinder formed of a material such as graphite. The strand may then be traversed across the face of a rotating spiral and wound as a forming package on a rotating collet carried by a winder. Alternatively, the strand from the gathering shoe may be passed between cutting blades and chopped into particulate glass fiber strands. In a further alternative, the strand may be attenuated by an attenuator, such as a belt or wheel attenuator, and collected in a container as a containerized package.

In each of the above operations, a significant amount of waste glass fiber strand is produced. In most of the above described operations inconsistent filament diameter results during start-up and slow down of the systems due to the fact that filament diameter is inversely proportional to the speed of attenuation for a given bushing.

Further, such occurrences as low speed attenuation during doffing of the forming package, restarting the strand formation process after a strand breakout, and the like are all examples of the formation of waste strand.

In the past, waste filaments were passed through the forming operation in the same manner as production quality filaments until they had passed the gathering shoe and were formed into strand. Only at this point were they segregated into waste. All of the waste strands and the filaments forming them had been coated with binder and/or size, just as the production quality filaments were coated. As the binder and/or size which has been coated onto the waste filaments cannot be recovered, when one realizes that waste strand may represent up to about 15 percent or more of the production of a typical glass fiber forming plant, it is obvious that the prior art strand formation methods consume a significant amount of binder and/or size which is in actuality being wasted. It is, therefore, desirable to substantially reduce the amount of binder and/or size which is wasted by being coated onto waste filaments.

A second problem encountered with the continual coating of filaments with binder and/or size occurs from the necessity of the forming level operator to manually handle the strands during such operations as start-up, and other occurrences of a glass fiber forming operation. To begin the winding of a new forming package on a collet, to begin the chopping of strand, to thread an attenuator, and to restart any of these devices after a strand breakout, the operator must manually feed the strand to the operation. This requires physical contact between the operator's skin and the coated strand. Some binders and/or sizes may have adverse dermatological effects on an operator's skin from the constant contact of the operator's hands with coated strands. It is also desirable, therefore, to reduce substantially or eliminate physical contact between the operator and glass strand having irritating binders and/or sizes coated thereon.

Concurrently filed U.S. application Ser. No. 775,483 filed Mar. 8, 1977 of David H. Griffiths and incorporated herein by reference discloses a method of reducing both binder and/or size waste and physical contact between the operator and the coated glass strands. Generally, the method comprises moving the filaments from the application surface of an applicator during the attenuation of waste filaments and their formation into waste strands while allowing the filaments to contact the application surface and become coated with the binder and/or size only during the formation of production quality strand. The present invention concerns apparatus for carrying out the aforementioned method.

THE PRESENT INVENTION

By means of the present invention, apparatus is provided to accomplish the desired results of the aforementioned method. The apparatus of the present invention comprises a gathering shoe which may reciprocate in a direction to move the filaments from the application surface of the applicator. When production strand is being produced, the gathering shoe is retracted to the normal position of a gathering shoe in a typical glass fiber forming operation. However, when waste strand is being produced, means are provided to extend the gathering shoe such that the filaments being gathered by the gathering shoe are directed away from the application surface of the applicator and are thus not coated with the binder and/or size. In addition, as the filaments are being removed from the application surface, they are sprayed with a lubricating material, but not the binder and/or size contained in the applicator, to reduce abrasion and to help prevent breakouts during the production of waste strand.

Suitable lubricants which may be employed are employed in amounts which are sufficient to provide lubricity to the strands, such amounts being about 4 to 15 percent by weight of a water mixture of the lubricant. Typical lubricants are alkyl imidazoline derivatives such as described in U.S. Pat. Nos. 2,200,815; 2,267,965; 2,268,273; and 2,355,837 which are incorporated herein by reference.

Cation X is an example of such a material wherein the alkyl imidazoline derivative is the reaction product of stearic acid, tetraethylene pentamine and acetic acid. Acid solubilized water dispersible stearic amides and anhydrous acid solubilized water dispersible lower molecular weight fatty acid amides as well as anhydrous acid solubilized polyunsaturated lower molecular weight fatty acid amides can also be used as lubricants.

The direction of travel for the gathering shoe may be generally horizontal, thus being approximately perpendicular to the generally vertical travel of the filaments and strand. However, this is not required. The gathering shoe may move at any desired angle to the filaments. It is required, however, that the amount of travel for the gathering shoe be sufficient to direct the filaments from their generally vertical path in a sufficient amount such that the filaments do not contact the application surface of the applicator when the gathering shoe mechanism is extended.

In the preferred embodiment, the gathering shoe is attached to an air cylinder which is in turn connected to a solenoid valve which allows air to pass through the air cylinder upon receiving electrical signals to extend and retract the gathering shoe.

BRIEF DESCRIPTION OF THE DRAWINGS

The apparatus of the present invention will be more fully described with reference to the figures in which:

FIG. 1 is a diagrammatic representation of a typical glass strand forming operation employing the apparatus of the present invention;

FIG. 2 is an enlarged side elevational view of the glass fiber forming operation illustrating the relation of the gathering shoe and the applicator when the gathering shoe is retracted to its normal position; and FIG. 3 is an enlarged side elevational view of the glass fiber forming operation of FIG. 2 illustrating the relation of the gathering shoe and the application surface when the gathering shoe is extended during the production of waste strand.

DETAILED DESCRIPTION OF THE DRAWINGS

Turning now to FIG. 1, glass filaments 14 are attenuated through bushing tips 12 located at the bottom of a heated glass fiber forming bushing 10 containing molten glass 11. The filaments 14 may be sprayed with water by spray jets 15 as they leave the bushing to cool them, depending upon the type of filaments being produced. Filaments 14 are then passed across the application surface 31 of an applicator 32 where they are coated with a binder and/or size. The filaments 14 are then passed into the groove of a gathering shoe 16, which is typically a grooved cylinder or wheel formed of a material such as graphite, where they are gathered into one or more unified strands 18. The operation of this gathering shoe will be more fully described below.

The strand 18 is then traversed across the face of a rotating spiral 28 and collected as a forming package 20 on a rotating collet 22 carried by a winder 24. Optionally, the strands 18 could be passed to a chopper or other attenuation means, such as a belt or wheel attenuator.

In operation, the collet 22 is rotated and collects the forming package 20 until a desired amount of strand 18 is wound. At this point, the winder is slowed to a stop. As the winder is stopped, the filaments 14 are removed from the application surface 31 of the applicator 32 by the gathering shoe, as will be described below, and the strand 18 is passed between a pair of rollers 29 by the operator to attenuate the filaments 14 at a slow speed, with the strand 18 not being coated with the binder and/or size while the operator is removing the forming package 20.

When the filaments 14 are removed from the application surface 32, they are sprayed with a lubricant from spray jets 13. If the filaments 14 were sprayed by the jets 15, the spray from the jets 13 is in addition to that spray. The lubricant from the spray jets 13 may be water alone or may include an additional lubricant material, as mentioned above, but it is not the binder and/or size which is supplied by the applicator 32. Thus, the strand 18 which passes between the rollers 29 into a waste chute (not shown) is not coated with the binder and/or size, thus substantially reducing binder and/or size consumption.

Optionally, instead of the spray jets 13, a stream of the lubricant could be applied to the filaments 14 by flowing the lubricant onto the gathering shoe 16 in sufficient quantities for the filaments 14, such as by means of a trickle tube connected to the source of lubricant, a sprayer, or any other convenient means.

When the operator is ready to begin the formation of a new forming package 20, he wraps the strand 18 around the collet 22 and begins its rotation. When the collet reaches full speed, such that the diameter of the filaments 14 being formed are of the desired production diameter, the filaments 14 are again contacted with the application surface 32 and production strand is again produced. Thus, the operator has not come into physical contact with the strand during the entire doffing operation while the strand is coated with binder and/or size.

Should a strand breakout occur, the filaments 14 are then removed from the application surface 32 and the spray jets 13 are activated. The operator then gathers the filaments 14 into a strand and "milks" the filaments from the bushing by pulling them with a hand-over-hand motion at slow speed, placing the strands 18 into the pull rolls 29 when he has gathered all the filaments 14. After changing the forming package 20, he again begins winding of a new forming package in the same manner as in a doffing operation, winding the strands at a slow speed and increasing the speed until production diameter filaments are produced, at which time the filaments 14 are again contacted with the application surface 31 and are coated with binder and/or size. Thus, the operator is able to handle the strand 18 and correct the filament breakout without coming into contact with binder and/or size coated strand and the waste strand which has been produced after the breakout has occurred and before the breakout is corrected is not coated with the binder and/or size, thus reducing binder and/or size consumption.

Turning now to FIGS. 2 and 3, the preferred gathering shoe apparatus for removing the filaments 14 from the application surface 31 is illustrated. In FIG. 2, the gathering shoe 16 is in its normal position during formation of production quality filaments. The filaments 14 being attenuated through the bushing tips 12 in the heated bushing 10 containing molten glass 11 pass downwardly across the application surface 31 of the applicator 32 and are coated with the binder and/or size. The filaments pass approximately vertically from the application surface 31 to the gathering shoe 16 where they are gathered into one or more unified strands 18. The strands 18 then pass to the winding operation as illustrated in FIG. 1, or, as is known in the art, to a chopping operation, attenuation operation and the like.

When production diameter strand production has ceased, and waste strand is being produced, an electric signal is passed through electric lines 45 and 46 to a solenoid valve 41, which is receiving incoming air from intake line 42. Upon receiving this signal, the valve 41 allows air to pass through line 43 and into an air cylinder 40. The air passing through line 43 into the cylinder 40 forces a piston 47 to extend from the cylinder 40. The gathering shoe 16 is connected to the end of this piston and moves outwardly with the piston 47. The filaments 14 being located within the groove of the gathering shoe 16 also extend outwardly from their approximately vertical direction of travel. As they move in this direction, they are removed from the application surface 31 of the applicator 32 and thus are no longer coated with the binder and/or size from the applicator 32. While the strand 18 is in this position, the strand is being coated with a lubricant, which may be waste alone or water containing an additional lubricant, as mentioned above, from sprayer 13 or other lubricant supply to prevent strand breakout during the attenuation of the waste filaments.

When attenuation has again reached the speed that production diameter filaments are produced, and the operator is ready to again collect production strand, a reversing signal is given to the solenoid valve 41 through electric lines 45 and 46. Upon receiving the reversing signal the valve 41 allows air to pass from the inlet 42 of the solenoid valve 41 through line 44 to the air cylinder 40, which retracts the piston 47 and relocates the gathering shoe 16 in its normal production position. This replaces the filaments 14 on the application surface 31 of the applicator 32 and the filaments are again coated with the binder and/or size and are ready to be collected as a production strand. At this point, the spray 13 ceases.

The electric signal to the solenoid valve 41 may be either manual, automatic or a combination of both. That is, lines 45 and 46 could be connected, for example, to a push button or the like, and the operator may remove the filaments 14 from the application surface and replace them as he desires. Preferably, however, the electric signals are automatically actuated by, for example, the speed of the rotating collet, the belt attenuator or chopper, whichever is employed, such that when attenuation is at full speed, the filaments 14 are automatically located onto the application surface 31 and whenever the speed is reduced or stopped, the filaments 14 are removed from the application surface 31.

From the foregoing, it is obvious that the present invention provides a simple apparatus for removing filaments from an application surface during the production of waste strand to substantially reduce binder and/or size consumption and allow the operator of a glass fiber forming operation to handle the filaments and strand without having to come into contact with the binder and/or size.

Although the invention has been described with reference to a specific embodiment thereof, it is not intended to be so limited thereby, except as set forth in the accompanying claims.

We claim:

1. Apparatus for removing glass filaments from an application surface of an applicator containing a binder and/or size for coating onto said filaments during attenuation of waste filaments from a bushing comprising a gathering shoe and means connected to said gathering shoe for extending and retracting said gathering shoe from a given position, said gathering shoe being oriented with relation to said application surface such that upon extending said gathering shoe said filaments are removed from said application surface and upon retracting said gathering shoe said filaments contact said application surface.

2. The apparatus of claim 1 wherein said means comprises a piston, said piston being connected to said gathering shoe, and means for extending and retracting said piston.

3. The apparatus of claim 2 wherein said means for extending and retracting comprises an air cylinder.

4. The apparatus of claim 1 further comprising means for applying a lubricant other than the binder and/or size in said applicator onto said filaments when said gathering shoe is extended.

5. The apparatus of claim 4 wherein said means comprises a spray jet.

6. An apparatus for forming glass strands comprising a bushing containing molten glass and having a plurality of bushing tips through which filaments are attenuated, an applicator having an application surface and containing a binder and/or size for applying the binder and/or size to the filaments, a gathering shoe for combining the filaments into one or more unified strands, means for attenuating said strands and the filaments associated therewith and means for extending and retracting said gathering shoe to remove said filaments from said application surface during attenuation of waste filaments and to contact said filaments with said application surface during the attenuation of production filaments.

7. The apparatus of claim 6 wherein said means for extending and retracting said gathering shoe comprises a piston connected to said gathering shoe and means for extending and retracting said piston.

8. The apparatus of claim 7 wherein said means for extending and retracting said piston comprises an air cylinder.

9. The apparatus of claim 6 wherein said means for attenuating comprises a rotating collet.

10. The apparatus of claim 6 wherein said means for attenuating comprises a chopper.

11. The apparatus of claim 6 wherein said means for attenuating comprises a belt attenuator.

12. The apparatus of claim 6 wherein said means for attenuating comprises a wheel attenuator.

* * * * *